| United States Patent [19] | [11] | 4,376,859 |
|---|---|---|
| Maurer et al. | [45] | Mar. 15, 1983 |

[54] PROCESS FOR THE PREPARATION OF ANILINE CONDENSATION DYESTUFFS

[75] Inventors: Werner Maurer; Johann Zimmer, both of Leverkusen, Fed. Rep. of Germany

[73] Assignee: Bayer Aktiengesellschaft, Leverkusen, Fed. Rep. of Germany

[21] Appl. No.: 219,607

[22] Filed: Dec. 24, 1980

[30] Foreign Application Priority Data

Jan. 9, 1980 [DE] Fed. Rep. of Germany ....... 3000529

[51] Int. Cl.$^3$ ..................... C07C 241/06; C09B 17/00; C09B 17/02; C09B 57/00
[52] U.S. Cl. ..................................... 544/348; 544/347
[58] Field of Search ................................ 544/347, 348

[56] References Cited

U.S. PATENT DOCUMENTS 1,988,499  3/1981  Kimmel .................................. 260/29
4,056,530  11/1977  Maekawa ............................. 544/348

OTHER PUBLICATIONS

Maekawa II, Chem. Abs. 88, 63262g, (1977).
Chem. Absts. vol. 88, #10, Mar. 6, 1978, p. 45 63262z
JP-A-77 135 336, (Orient Chemical Industries, Ltd.).
Chem. Absts. vol. 84, No. 10, Mar. 1976, p. 95, No. 61207d, (Orient Chemical Industries, Ltd.), 23-10-75 Japanese A 75 134 028.

*Primary Examiner*—Mark L. Berch
*Attorney, Agent, or Firm*—Sprung, Horn, Kramer & Woods

[57] ABSTRACT

Process for the preparation of aniline condensation dyestuffs by reacting aniline and/or an alkylaniline batchwise, in cycles or continuously with nitrobenzene, which can be substituted and/or diazoaminobenzene, with warming and in the presence of a catalyst, characterized in that the reaction mixture is worked up continuously.

7 Claims, No Drawings

PROCESS FOR THE PREPARATION OF ANILINE CONDENSATION DYESTUFFS

The invention relates to processes for the preparation of aniline condensation dyestuffs, in which working-up is carried out continuously.

The preparation of nigrosine dyestuffs by a condensation reaction of aniline and nitrobenzene in the presence if iron salts and mineral acids has been known for a long time. The working-up of these raw materials, which are dissolved in excess aniline, by washing with water, acids or alkalis or with combinations of these substances—such as, for example, first with acid and then with water—and the subsequent drying of the aniline-containing phase have also been prior art for many years. (Ullmann, Volume 8, 4th edition, pages 230–231).

Japanese Pat. No. 50,134,028 describes a process which provides a continuous condensation reaction in two successive temperature steps.

U.S. Pat. No. 4,056,530 describes a semi-continuous process for the preparation of nigrosine dyestuffs, in which the condensation reaction is carried out step-wise at various temperatures.

The present invention relates to a process for the preparation of aniline condensation dyestuffs by reacting aniline and/or an alkylaniline with nitrobenzene, which can be substituted, and/or diazoaminobenzene, with warming and in the presence of a catalyst, which is characterised in that the reaction mixture is worked up continuously.

In the condensation reaction, which is in itself known, a halogenonitrobenzene, especially o-chloronitrobenzene, and/or an alkylnitrobenzene are preferably employed in addition to nitrobenzene and diazoaminobenzene.

The catalysts used are preferably iron salts, optionally in the presence of mineral acids.

Particularly preferentially, the process according to the invention is used to prepare nigrosine dyestuffs by a condensation reaction of aniline and nitrobenzene in the presence of iron chloride and optionally hydrochloric acid.

The condensation reaction can be carried out in the conventional manner, batchwise, in cycles or continuously.

Thus, a partially continuous process according to the invention is characterised in that the condensation reaction is carried out by the cycle process, whilst working-up of the condensation dyestuffs formed and also, optionally, of the aniline-containing effluent is carried out continuously.

In the case of the partially continuous process, for example, aniline, iron chloride and optionally hydrochloric acid are fed or introduced at the same time or successively into a reactor; metering is effected by means of balances, measuring vessels, volume meters of flowmeters. Iron chloride can be added in the form of a powder or in the form of an aqueous solution. The reactors are charged in cycles. The number of reactors and the particular reaction temperature (about 120° to 200° C.) are dependent on the type of condensation dyestuff to be prepared. If several reactors are employed, a temperature cascade is advantageously used.

The 1st reactor is filled with the reactants. After a set time, the batch is conveyed from the 1st reactor into the 2nd reactor, and after a further set time is conveyed from the 2nd reactor into the 3rd reactor, and so on. When the 1st reactor is empty, it can be re-charged.

Conveying of the reaction mixture from one reactor to another or from the final reactor into the working-up stage can be effected by means of pumps or by expressing with nitrogen or, if the position permits, by gravity.

A condensation reaction in cycles, which according to the invention can precede the continuous working-up, has, for example, also been disclosed in U.S. Pat. No. 4,056,530.

Working-up of the condensation dyestuff melts and, optionally, of the effluents is effected continuously in the manner described further below.

A fully continuous process according to the present invention is characterised in that both the condensation reaction and the working-up of the condensation dyestuffs formed and also, optionally, of the aniline-containing effluents are carried out continuously.

In this process, for example, aniline, nitrobenzene, iron chloride solution and optionally hydrochloric acid are fed into the reactors via flowmeters or volume meters, such as, for example, cylindrical piston counters.

The desired amounts of liquid are metered in by means of control valves which are connected in between. The components are pumped into the reactors or, if the position of the reservoir vessels permits, are fed into the reactors by gravity.

The ratios of the reactants are fixed for each type of dyestuff. By means of a cascade arrangement governed by one control variable (for example aniline), adjustment of the other components can then be effected in a simple manner, with a change in the throughput rate.

Setting specific levels in the reactors ensures that the reactor volumes available and thus, for a constant throughput rate, the residence times remain constant.

Conveying of the reaction mixture is effected by means of pumps or, if the position of the reactors permits, by the natural difference in height.

The particular reaction temperature depends on the condensation dyestuff to be prepared; it is in general in the range of 120°–200° C.

The continuous working-up of the dyestuffs obtained by the condensation reaction carried out batchwise, in cycles or continuously can be effected by (a) mixing the resulting aniline-containing dyestuff melt continuously with an aqueous medium, if necessary adjusting the pH value depending on the type of dyestuff and optionally continuously separating the aqueous phase from the aniline-containing dyestuff melt and removing aniline, or (b) intimately mixing the aniline-containing dyestuff melt with hydrochloric acid, continuously filtering off the dyestuff which has precipitated out and continuously washing the latter and, optionally continuously, drying the filtration residue, optionally after wet-grinding and filtering off again; or (c) substantially freeing the aniline-containing dyestuff melt from aniline by spray-drying, distillation under normal pressure or in vacuo or similar procedures, before mixing the melt with an aqueous medium.

The continuous procedure according to route (a) can be effected for example, by intimately mixing the nigrosine melt continuously with water, dilute, preferably 2–20% strength, sodium hydroxide solution or dilute, preferably 0.5–2% strength hydrochloric acid, with aqueous-alkaline sodium chloride solution containing preferably 2–8% of sodium chloride and 2–15% of sodium hydroxide, or with aqueous-acid sodium chloride solution containing preferably 2–8% of sodium chloride and 0.5–2% of hydrochloric acid, or with 4–12% strength sodium chloride solution, in reactors with effective stirrers or in mixing tubes, mixing nozzles or mixing pumps. The mixture then passes into separators, where separation into aniline-containing dyestuff solution and inorganic phase takes place and the two phases run off continuously.

After again separating the organic phase and the aqueous phase in a separator, the aniline-containing dyestuff solution passes into a dryer, in order to remove aniline. Optionally, the dyestuff is also washed after drying.

Continuously working-up according to route (b) can be effected, for example, by precipitating the dyestuff by continuous mixing of the nigrosine melt with relatively large amounts of dilute, preferably 2–10% strength, hydrochloric acid in reactors with effective stirrers or in mixing tubes, mixing nozzles or mixing pumps, conveying the dyestuff to a continuous filter and continuously filtering off and washing. Depending on the field of application of the condensation dyestuff to be prepared, the moist dyestuff isolated is neutralised, ground and dried or dried and ground or only dried. Optionally, a further filtration can be included after neutralisation. Finishing of the dyestuffs by drying and/or grinding can be carried out continuously or discontinuously. Spray-drying or atomiser-drying and contact drying are suitable, for example, for drying.

Continuous working-up according to route (c) can, for example, be effected by substantially freeing the nigrosine melt, continuously or in cycles, from aniline in a dryer and then continuously digesting the dry dyestuff with dilute, preferably 2–10% strength, hydrochloric acid in reactors with effective stirrers or in mixing tubes, mixing nozzles or mixing pumps, then conveying the dyestuff to a continuous filter and continuously filtering off and washing. Depending on the field of application of the condensation dyestuff to be prepared, the moist dyestuff isolated is neutralised, ground and dried, or dried and ground or only dried. Optionally, a further filtration can be included after neutralisation. Finishing of the dyestuffs by drying and/or grinding can be carried out continuously or discontinuously. Spray-drying or atomiser-drying and contact drying are suitable for drying.

The nigrosine dyestuffs are used as water-insoluble pigment dyestuffs, for example for dyeing plastics and fibres and for the preparation of shoe creams.

These water-insoluble nigrosine dyestuffs are employed in the form of the free nigrosine bases or in the form of their salts, for example in the form of the hydrochloride.

Water-soluble nigrosines are obtained by sulphonating the water-insoluble nigrosine dyestuffs with sulphuric acid and/or oleum, and these water-soluble nigrosines are employed for dyeing paper, leather, plastics and the like and as flotation aids.

EXAMPLE 1

Aniline, nitrobenzene and an iron chloride solution containing hydrochloric acid are reacted at temperatures of 150°–180° C. in two reactors connected in series. The components are metered continuously into the 1st reactor. Per hour, the following quantities are fed in: 375 kg of aniline, 138 kg of nitrobenzene and 75 kg of an iron-II choride solution. The latter contains 22% of $FeCl_2$, 18% of HCl and 60% of $H_2O$. The 1st reactor is operated at 150° C. and the 2nd reactor at 180° C. The mean residence time per reactor is 12 hours. The reaction mixture is conveyed continuously from the 1st reactor into the 2nd reactor. Water vapour which is liberated is condensed in condensers and collected in receivers. The finished dyestuff, dissolved in excess aniline, (dyestuff melt) is fed continuously from the 2nd reactor into the working-up stage. In the latter, the dyestuff melt is continuously mixed with dilute, approximately 8% strength, aqueous hydrochloric acid, and the dyestuff precipitates out. The dyestuff is continuously filtered off in a vacuum rotary filter, and washed with water. It is then dried and, if desired, ground. The filtrates, the condensate from the reaction and the distillate from the drying stage are fed continuously, after neutralisation with sodium hydroxide solution, into a column in order to free them from aniline by blowing in steam. The aniline which is recovered is then re-used.

EXAMPLE 2

Aniline, nitrobenzene and an iron chloride solution containing hydrochloric acid are reacted at temperatures of 120–200° C. in 4 reactors connected in series. The components are metered continuously into the 1st reactor. Per hour, the following quantities are fed in: 640 kg of aniline, 235 kg of nitrobenzene and 127 kg of an iron-II chloride solution. The latter contains 22% of $FeCl_2$, 18% of HCl and 60% of $H_2O$. The 1st reactor is operated at 120° C., the 2nd reactor at 155° C., the 3rd reactor at 180° C. and the 4th reactor at 200° C. The mean residence time in reactors 1–3 is 7 hours and in reactor 4 is 3 hours. The reaction mixture is conveyed continuously from one reactor to another. Water vapour which is liberated is condensed and collected in receivers. The dyestuff melt is fed continuously from the 4th reactor into the working-up stage. In the latter, the dyestuff melt is mixed continuously with dilute, approximately 6% strength, aqueous hydrochloric acid, and the dyestuff precipitates out. The dyestuff is filtered off continuously in a vacuum rotary filter, and washed with water. The aqueous dyestuff suspension is then neutralised with sodium hydroxide solution. The suspension is filtered again and the dyestuff is washed with water. The moist filter cake is ground in a wet grinding mill, for example a trigonally notched ring mill, and the water is removed in a dryer. The filtrates, the condensate from the reaction and the distillate from the drying stage are fed continuously, after neutralisation with sodium hydroxide solution, into a column in order to free them from aniline by blowing in steam. The aniline which is recovered is re-used.

EXAMPLE 3

Aniline, nitrobenzene and an iron chloride solution containing hydrochloric acid are reacted at temperatures of 150°–180° C. in 3 reactors connected in series. The components are metered continuously into the 1st reactor. Per hour, the following quantities are fed in: 420 kg of aniline, 207 kg of nitrobenzene and 113 kg of an iron-II chloride solution. The latter contains 22% of $FeCl_2$, 18% of HCl and 60% of $H_2O$. The 1st reactor is operated at 150° C., the 2nd reactor at 175° C. and the 3rd reactor at 180° C. The mean residence time per reactor is 8 hours. The reaction mixture is conveyed continuously from one reactor to another. Water vapour which is liberated is condensed and collected in receivers. The dyestuff melt is fed continuously from the 3rd reactor into the working-up stage. In this stage the hot melt is mixed continuously with water and the product phase is separated from the aqueous phase in a separator and dried in a dryer to give the aniline-free product. The dyestuff can be employed as such or, if desired, can be ground. The aniline recovered from the drying stage is re-used. The aniline-containing water from the reaction (condensate) and from the separation are fed continuously, after neutralisation with sodium hydroxide solution, into a column in order to free them from aniline by blowing in steam. The aniline recovered in this stage is also re-used.

EXAMPLE 4

Aniline, nitrobenzene and aqueous iron chloride solution are reacted at temperatures of 150°–180° C. in 3 reactors connected in series. The components are metered continuously into the 1st reactor. Per hour, the following quantities are fed in: 210 kg of aniline, 104 kg of nitrobenzene and 50 kg of a 30% strength aqueous iron-II chloride solution. The 1st reactor is operated at 150° C., the 2nd reactor at 170° C. and the 3rd reactor at 175° C. The mean residence time per reactor is 16 hours. The reaction mixture is conveyed continuously from one reactor to another. Water vapour which is liberated is condensed and collected in receivers. The dyestuff melt is fed continuously from the 3rd reactor into the working-up stage. In this stage, the dyestuff melt is mixed continuously with dilute, approximately 6% strength aqueous hydrochloric acid, and the dyestuff precipitates out. The dyestuff is continuously filtered off and washed with water. It is then ground wet and again filtered off (belt filter) and washed. The dyestuff is then dried. The filtrates, the condensate from the reaction and the distillate from the drying stage are fed continuously, after neutralisation with sodium hydroxide solution, into a column, in order to free them from aniline by blowing in steam. The aniline which is recovered is re-used.

EXAMPLE 5

Aniline, nitrobenzene and an iron chloride solution containing hydrochloric acid are reacted at temperatures of 150°–185° C. in 4 reactors connected in series. The components are metered into the 1st reactor in the following ratio: 480 kg of aniline, 235 kg of nitrobenzene and 127 kg of iron chloride solution. The latter contains 22% of $FeCl_2$, 18% of HCl and 60% of $H_2O$. The 1st reactor is operated at 150° C., the 2nd reactor at 165° C., the 3rd reactor at 175° C. and the 4th reactor at 185° C. After a residence time of 7 hours in the 1st reactor, the reaction mixture is fed into the 2nd reactor. After a residence time of 7 hours in the 2nd reactor, the reaction mixture is fed into the 3rd reactor. After a residence time 7 hours in the 3rd reactor, the reaction mixture is fed into the 4th reactor, where it is kept at 185° C. for 3 hours. The dyestuff melt is then cooled to 100° C. and continuously mixed with dilute, approximately 10% strength aqueous hydrochloric acid, and the dyestuff precipitates out. The dyestuff is continuously filtered off in a vacuum rotary filter, and washed with water. The moist filter cake is then neutralised with sodium hydroxide solution, the mixture is filtered again and the dyestuff is washed with water. The moist filter cake is ground in a corundum disc mill and the water is removed in a dryer. The filtrates, the condensate from the reaction and the distillate from the drying stage are continuously fed, after neutralisation with sodium hydroxide solution, into a column in order to free them from aniline by steam distillation. The aniline which is recovered is re-used.

EXAMPLE 6

Aniline, nitrobenzene and an iron chloride solution containing hydrochloric acid are reacted at temperatures of 130°–180° C. in 3 reactors connected in series. The components are metered into the 1st reactor in the following ratio: 560 kg of aniline, 184 kg of nitrobenzene and 113 kg of iron chloride solution. The latter contains 22% of $FeCl_2$, 18% of HCl and 60% of $H_2O$. The 1st reactor is operated at 130° C., the 2nd reactor at 170° C. and the 3rd reactor at 180° C. After a residence time of 6 hours in the 1st reactor, the reaction mixture is fed into the 2nd reactor and after a residence time of 6 hours in the 2nd reactor, the reaction mixture is fed into the 3rd reactor. The reaction mixture also remains in this reactor for 6 hours. The dyestuff melt is then cooled to 100° C. and continuously mixed with dilute, approximately 6% strength aqueous hydrochloric acid, and the dyestuff precipitates out. The dyestuff is filtered off and washed with water. The moist filter cake is neutralised with sodium hydroxide solution, the mixture is filtered again and the dyestuff is washed with water. The moist filter is ground in a wet grinding mill, for example a toothed colloid mill, and the water is removed in a dryer. The filtrates, the condensate from the reaction and the distillate from the drying stage are continuously fed, after neutralisation with sodium hydroxide solution, into a column in order to free them from aniline by steam distillation. the aniline which is recovered is re-used.

EXAMPLE 7

Aniline, nitrobenzene, aqueous iron-II chloride solution and hydrochloric acid are reacted at temperatures of 150°–185° C. in 4 reactors connected in series. The components are metered in in the following ratio: 840 kg of aniline, 310 kg of nitrobenzene, 60 kg of iron-II chloride solution (aqueous, 30% strength) and 450 kg of 30% strength hydrochloric acid. The 1st reactor is operated at 150° C., the 2nd reactor at 165° C., the 3rd reactor at 175° C. and the 4th reactor at 185° C. The residence time in each reactor is 12 hours. The reaction mixture is fed in cycles, after 12 hours in each case, from the 1st reactor to the 2nd reactor, from the 2nd reactor to the 3rd reactor, from the 3rd reactor to the 4th reactor and from the 4th reactor to the working-up stage. In the latter stage, the dyestuff melt is continuously mixed with dilute, approximately 8% strength aqueous hydrochloric acid, and the dyestuff precipitates out. The dyestuff is continuously filtered off in a vacuum rotary filter, and washed with water. It is then continuously rendered slightly alkaline with sodium hydroxide solution, filtered off again and washed with water. The moist filter cake is ground in a wet grinding mill, for example a trigonally toothed ring mill, and dried in a dryer.

After neutralisation with sodium hydroxide solution, the filtrates, the condensate from the reaction and the distillate from the drying stage are continuously freed from aniline in a column for the removal of aniline from the effluent with the aid of steam (stripper column) with a recirculating vaporiser. The aniline which is recovered is re-used.

EXAMPLE 8

Aniline, nitrobenzene and an iron chloride solution containing hydrochloric acid are reacted at temperatures of 150°–180° C. in 3 reactors connected in series. The components are metered continuously into the 1st reactor. Per hour, the following quantities are fed in: 420 kg of aniline, 207 kg of nitrobenzene and 113 kg of an iron-II chloride solution. The latter contains 22% of $FeCl_2$ 18% of HCl and 60% of $H_2O$. The 1st reactor is operated at 150° C., the 2nd reactor at 170° C. and the 3rd reactor at 180° C. The mean residence time per reactor is 8 hours. The reaction mixture is fed continuously from one reactor to another. The dyestuff melt is fed continuously from the 3rd reactor into the working-up stage. After cooling to 120° C., the dyestuff melt is continuously mixed with an aqueous alkaline sodium chloride solution, which contains about 5% of NaCl and about 12% of NaOH, the mixture is separated in a separator to remove the aqueous phase and the product phase is again continuously mixed with hot water and separated in a separator to remove the aqueous phase. The aqueous phase separates off at the bottom in the 1st separator and at the top in the 2nd separator. After separating, the purified dyestuff melt is freed from aniline and water in a dryer. The dyestuff can be employed as such or, if desired, can be ground. The aniline-containing water from the reaction, from the separation and from the drying stage is continuously freed from aniline by steam distillation. The aniline which is recovered is re-used.

EXAMPLE 9

Aniline, nitrobenzene and an iron chloride solution containing hydrochloric acid are reacted at temperatures of 120°–185° C. in a reactor. The components are introduced into the reactor in the following ratio: 480 kg of aniline, 200 kg of nitrobenzene and 127 kg of iron chloride solution. The latter contains 22% of $FeCl_2$, 18% of HCl and 60% of $H_2O$. The reaction time is 10 hours at 120°–150° C. and 12 hours at 170°–185° C. The dyestuff melt is then fed into a dryer and is there substantially freed from aniline by vacuum distillation or by spray-drying. The dry dyestuff is continuously mixed, by means of a metering screw, with dilute, approximately 4% aqueous hydrochloric acid, continuously filtered off in a continuous filter and washed with water. The moist filter cake is then ground in a wet grinding mill and the water is removed in a dryer. The aniline recovered on drying the dyestuff melt is re-used.

We claim:

1. In a process for the preparation of an aniline condensation dyestuff by reacting aniline and/or an alkyl aniline, batchwise, in cycles or continuously with nitrobenzene, which can be substituted, and/or diazoaminobenzene, with warming and in the presence of a catalyst, the improvement wherein the reaction mixture is worked up by continuously mixing the same with dilute hydrochloric acid and the dyestuff which has precipitated out is continuously filtered off.

2. Process according to claim 1, characterised in that aniline and nitrobenzene are subjected to a condensation reaction in the presence of an iron salt.

3. A process according to claim 2, wherein the condensation reaction is carried out in the presence of hydrochloric acid.

4. A process according to claim 1, wherein said dilute hydrochloric acid is hydrochloric acid of 2–10% strength.

5. Process according to claim 1, characterised in that the dyestuff melt is substantially freed from aniline by spray-drying or distillation under normal pressure or in vacuo, before the melt is mixed with an aqueous medium.

6. Process according to claim 1, characterised in that mixing is carried out in reactors with effective stirrers or in mixing tubes, mixing nozzles or mixing pumps.

7. Process according to claim 1, characterised in that the continuous mixing of the dyestuff melt with an aqueous medium is followed by continuous isolation of the dyestuff by filtering off, washing, optionally wet-grinding, optionally filtering off again and optionally drying.

* * * * *